(12) United States Patent
Weber

(10) Patent No.: US 11,375,789 B2
(45) Date of Patent: Jul. 5, 2022

(54) MAGNETIC FASTENER

(71) Applicant: Apple Inc., Cupertino, CA (US)

(72) Inventor: Douglas J. Weber, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 586 days.

(21) Appl. No.: 15/537,846

(22) PCT Filed: Dec. 14, 2015

(86) PCT No.: PCT/US2015/065619
§ 371 (c)(1),
(2) Date: Jun. 19, 2017

(87) PCT Pub. No.: WO2016/106002
PCT Pub. Date: Jun. 30, 2016

(65) Prior Publication Data
US 2017/0360171 A1    Dec. 21, 2017

Related U.S. Application Data

(60) Provisional application No. 62/095,707, filed on Dec. 22, 2014.

(51) Int. Cl.
*A45C 13/10* (2006.01)
*G06F 1/16* (2006.01)
(Continued)

(52) U.S. Cl.
CPC .......... *A45C 13/1069* (2013.01); *E05C 19/16* (2013.01); *F16B 1/00* (2013.01);
(Continued)

(58) Field of Classification Search
CPC .......... A45C 13/1069; F16B 1/00; F16B 2/10; F16B 2001/0035; H04F 7/021;
(Continued)

(56) References Cited

U.S. PATENT DOCUMENTS 3,009,225 A * 11/1961 Budreck ................ E05C 19/16
24/303
3,468,576 A *  9/1969 Beyer .................... E05C 19/16
292/251.5

(Continued)

FOREIGN PATENT DOCUMENTS

CN          2850379 Y     12/2006
CN        101168090 A      4/2008
(Continued)

*Primary Examiner* — Christine M Mills
*Assistant Examiner* — Faria F Ahmad
(74) *Attorney, Agent, or Firm* — Treyz Law Group, P.C.; G. Victor Treyz; Kendall P. Woodruff

(57) ABSTRACT

An item may be provided with a body that forms an enclosure. The body (12) may have body portions (16, 18) that open and close along a seam (14). An elongated magnetic fastener (36) may run along the seam. The magnetic fastener may have first (38) and second (40) portions on opposing sides of the seam. The first and second portions may include magnets. When the magnetic fastener is operated in a closed state, the magnets in the first and second portions attract each other and pull the first and second portions of the fastener together to close the seam. When the magnetic fastener is operated in an open state, the magnets in the first and second portions repel each other and push the first and second portions of the fastener apart to open the seam.

27 Claims, 18 Drawing Sheets

(51) Int. Cl.
  *E05C 17/56* (2006.01)
  *E05C 19/16* (2006.01)
  *F16B 1/00* (2006.01)
  *F16B 2/10* (2006.01)
  *H01F 7/02* (2006.01)

(52) U.S. Cl.
  CPC .............. *F16B 2/10* (2013.01); *G06F 1/1679* (2013.01); *H01F 7/021* (2013.01); *E05C 17/56* (2013.01); *F16B 2001/0035* (2013.01); *Y10T 292/11* (2015.04)

(58) Field of Classification Search
  CPC .............. Y10T 292/11; E05B 15/0073; E05B 47/0044; E05B 2047/0074; E05B 47/0046; E05C 19/16; E05C 19/161; E05C 19/163; E05C 19/168; E05C 17/56; H01F 7/021
  USPC ............... 361/683, 147, 148, 681; 292/251.5
  See application file for complete search history.

(56) References Cited

U.S. PATENT DOCUMENTS

| | | | | |
|---|---|---|---|---|
| 3,624,457 A * | 11/1971 | Lombard | .................. | H02P 9/08 361/148 |
| 3,634,735 A * | 1/1972 | Komatsu | ............... | H01F 7/1646 361/194 |
| 4,401,346 A * | 8/1983 | Jones | ...................... | E05C 17/56 292/144 |
| 6,366,440 B1 * | 4/2002 | Kung | ................... | E05C 19/16 361/147 |
| 6,464,312 B1 * | 10/2002 | Tenhundfeld | ......... | E05C 19/161 312/296 |
| 6,477,749 B1 * | 11/2002 | Reiter | ..................... | A41F 1/002 24/303 |
| 6,765,330 B2 * | 7/2004 | Baur | ..................... | F16B 7/0473 310/103 |
| 6,922,333 B2 * | 7/2005 | Weng | ................... | G06F 1/1616 220/230 |
| 7,082,035 B2 * | 7/2006 | Kim | ........................ | E05C 19/16 292/251.5 |
| 7,267,378 B2 * | 9/2007 | Drumm | ................. | E05C 19/163 292/251.5 |
| 7,583,500 B2 * | 9/2009 | Ligtenberg | ............ | G06F 1/1616 361/147 |
| 7,775,567 B2 * | 8/2010 | Ligtenberg | ............ | G06F 1/1613 292/251.5 |
| 7,852,621 B2 * | 12/2010 | Lin | ........................ | G06F 1/1698 361/679.02 |
| 7,942,458 B2 * | 5/2011 | Patterson | ................ | E05F 5/027 292/251.5 |
| 8,899,636 B2 * | 12/2014 | Fitzgerald | ........... | E05B 15/0053 292/251.5 |
| 8,914,104 B2 * | 12/2014 | Kubat | ..................... | E05C 19/16 607/5 |
| 8,964,379 B2 * | 2/2015 | Rihn | ....................... | E05C 19/16 361/679.56 |
| 9,297,189 B2 * | 3/2016 | Ho | ........................... | E05C 19/16 |
| 9,447,619 B2 * | 9/2016 | Trinh | ..................... | G06F 1/1679 |
| 10,120,420 B2 * | 11/2018 | Bathiche | ................ | G06F 1/1632 |
| 10,257,950 B2 * | 4/2019 | Maatta | .................... | H01F 7/021 |
| 2005/0023841 A1 * | 2/2005 | Chen | .................... | G06F 1/1616 292/251.5 |
| 2006/0049645 A1 * | 3/2006 | Drumm | ................. | E05C 19/163 292/251.5 |
| 2006/0145485 A1 * | 7/2006 | Hapke | .................. | A47L 15/4259 292/251.5 |
| 2007/0028429 A1 * | 2/2007 | Ishida | ................. | A45C 13/1069 24/303 |
| 2007/0039141 A1 * | 2/2007 | Rairden | ................... | E05C 19/16 24/303 |
| 2007/0133156 A1 | 6/2007 | Ligtenberg et al. | | |
| 2007/0138806 A1 * | 6/2007 | Ligtenberg | ........... | H05K 5/0221 292/251.5 |
| 2007/0159033 A1 * | 7/2007 | McBroom | ............... | G06F 1/181 312/223.2 |
| 2008/0048654 A1 * | 2/2008 | Takahashi | ............ | G01D 5/2452 324/207.25 |
| 2008/0186683 A1 * | 8/2008 | Ligtenberg | ............ | G06F 1/1679 361/726 |
| 2009/0261600 A1 * | 10/2009 | D'Ambrosio | ......... | E05C 19/161 292/251.5 |
| 2009/0273194 A1 * | 11/2009 | Patterson | ................ | E05C 19/16 292/251.5 |
| 2009/0296328 A1 * | 12/2009 | Lin | ........................ | G06F 1/1686 361/679.02 |
| 2011/0068885 A1 * | 3/2011 | Fullerton | .............. | G06F 1/1616 335/306 |
| 2012/0007705 A1 * | 1/2012 | Fullerton | ................ | H01F 7/021 335/306 |
| 2012/0242440 A1 * | 9/2012 | Fullerton | .................. | E06B 5/00 335/306 |
| 2014/0034080 A1 | 2/2014 | Paquet et al. | | |
| 2014/0047677 A1 * | 2/2014 | Trinh | .................... | G06F 1/1679 24/303 |
| 2014/0306463 A1 * | 10/2014 | Ho | .......................... | E05C 19/16 292/251.5 |
| 2015/0237748 A1 * | 8/2015 | Andre | .................. | E05B 17/0033 361/679.55 |

FOREIGN PATENT DOCUMENTS

| | | | | |
|---|---|---|---|---|
| CN | 201734054 U | | 2/2011 | |
| CN | 102258257 A | | 11/2011 | |
| CN | 103829542 A | | 6/2014 | |
| DE | 2455520 A1 | * | 5/1976 | ............ E05C 19/16 |
| DE | 19922618 A1 | | 12/2000 | |
| EP | 1574147 | | 9/2005 | |
| EP | 2281476 A1 | | 2/2011 | |
| TW | M462886 | * | 4/2013 | |

\* cited by examiner

MAGNETIC FASTENER

This application claims priority to U.S. Patent Application No. 62/095,707, filed Dec. 22, 2014, which is hereby incorporated by reference herein in its entirety.

BACKGROUND

This relates generally to fasteners, and, more particularly, to magnetic fasteners.

Bags and other items are often provided with zippers and other mechanical fasteners. A zipper is opened and closed by moving a slider between two sets of interdigitated teeth. Some fasteners use magnets. For example, a magnetic clasp may be used to secure an opening in a bag. Fasteners may also be formed from snaps and buttons.

Zippers can be unsightly and may be time consuming to open and close. Clasps such as magnetic clasps may be faster to open and close than zippers, but may not satisfactorily seal large openings. Buttons and snaps may also be incapable of forming sufficiently tight seals for openings and may be even more time consuming to use than zippers.

It would therefore be desirable to be able to provide improved fasteners.

SUMMARY

An item may be provided with a body having portions that open and close along a seam. The item may be an enclosure such as a bag, case, or cover, or an enclosure such as a device housing in a laptop computer or other electronic device. An enclosure may have an interior that receives personal articles, circuits and other device components, or other objects. The interior of a container such as a bag may be accessed from outside the body of the enclosure when the seam is opened.

An elongated magnetic fastener may run along the seam. The magnetic fastener may have first and second portions on opposing sides of the seam. The first and second portions may include magnets. When the magnetic fastener is operated in a closed state, the magnets in the first and second portions attract each other and pull the first and second portions of the fastener together to close the seam. When the magnetic fastener is operated in an open state, the magnets in the first and second portions repel each other and push the first and second portions of the fastener apart to open the seam.

DETAILED DESCRIPTION

A magnetic fastener may be used as a closure for an opening in an electronic device such as a laptop computer or other device with a hinged opening or may be used as a closure in other items such as bags and cases. Magnetic fasteners may also be used in items of clothing, luggage, automobile, pieces of furniture, or in other items. Configurations in which magnetic fasteners are used to secure openings in enclosures that have been formed as parts of items of electronic equipment and items such as bags, cases, covers, or other containers are sometimes described herein as an example.

Figure 1:
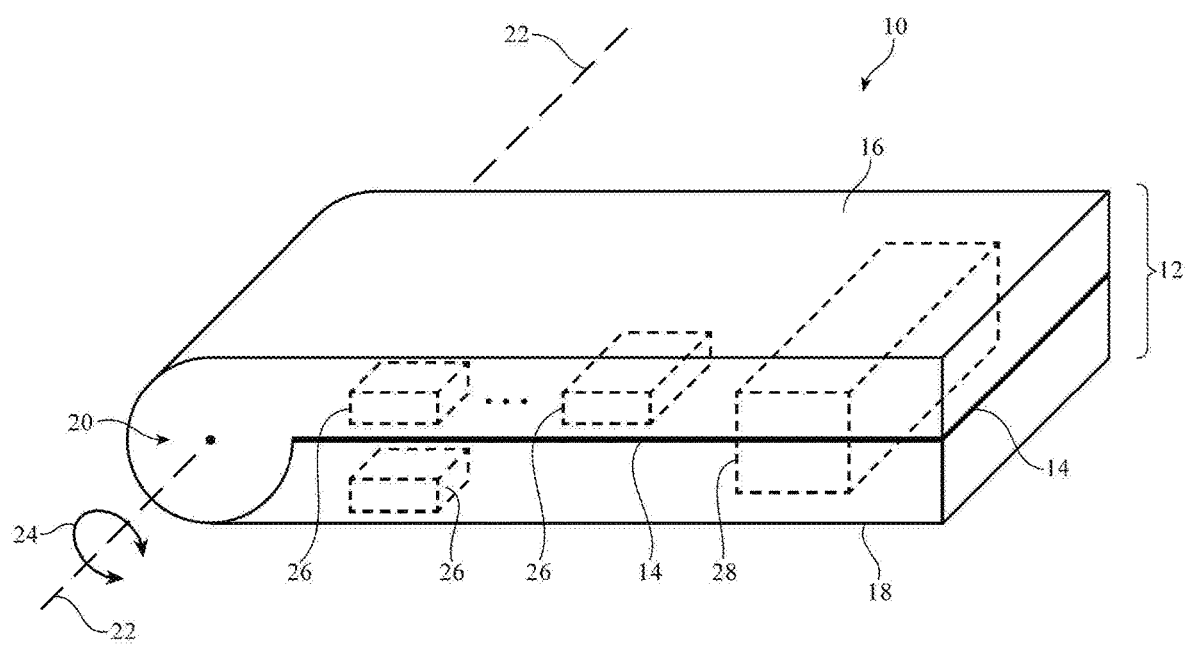
FIG. 1 is a perspective view of an illustrative electronic device or other item having a body that forms an enclosure with an opening that is secured using a magnetic fastener in accordance with an embodiment.

An illustrative item with an opening that is secured by a magnetic fastener is shown in FIG. 1. As shown in FIG. 1, item 10 may have a body such as body 12. Body 12 may be formed from plastic, metal, glass, ceramic, sapphire or other crystalline materials, wood or other natural materials, strands of plastic, metal, or other material that are embedded in a binder and/or that are intertwined to form fabric, other materials, or combinations of these materials. Body 12 may form an enclosure with an interior. For example, body 12 may form a housing for an electronic device or may form portions of a bag, case, or cover, or other item that is used as a container for electronic devices or other articles. If desired, body 12 may form portions of a system in an automobile or other vehicle, may form part of an item of furniture, or may form other structural components for item 10.

Body 12 may have movable portions such as portions 16 and 18. A hinge such as hinge 20 may be coupled to portions 16 and 18 to allow portions 16 and 18 to rotate relative to each other. Portions 16 and 18 may, for example, rotate in directions 24 about rotational axis 22. When rotated away from each other, portions 16 and 18 may separate to form an opening in body 12. If desired, mechanisms other than hinge 20 may be incorporated into body 12 to allow portions 16 and 18 to be separated from each other to form an opening in body 12. The use of a hinge is merely illustrative.

When portions 16 and 18 are separated, seam 14 opens and forms an opening in body 12. When portions 16 and 18 are joined together along seam 14, the opening in body 12 is closed. An elongated magnetic fastener may run along seam 12 and may be used to hold body 12 together along the length of seam 14 when item 10 is in its closed state. When it is desired to move portions 16 and 18 apart to form an opening in body 12, the magnetic fastener that runs along seam 12 may be released.

Portions 16 and 18 may be first and second housing portions in an electronic device. For example, item 10 may a laptop computer, cellular telephone, or other portable electronic device with a hinged opening. Portion 16 may be, for example, the upper housing of a laptop computer that is used to support a display and portion 18 may be the lower housing of a laptop computer that is used to support a keyboard and trackpad. In configurations in which item 10 is a bag, case, or cover, portions 16 and 18 may be first and second portions of the bag, case, or cover (as examples).

Body 12 of item 10 may be shaped to form an enclosure with an interior portion. In a configuration in which item 10 is an electronic device, input-output devices such as displays and keyboards, batteries, circuits, and other electrical components may be mounted in the housing formed from body 12 (see, e.g., components 26). In a configuration in which item 10 is a bag, case, or cover, item 10 may have a hollow interior that is used to contain electronic devices or other objects (see, e.g., article 28).

Figure 2:
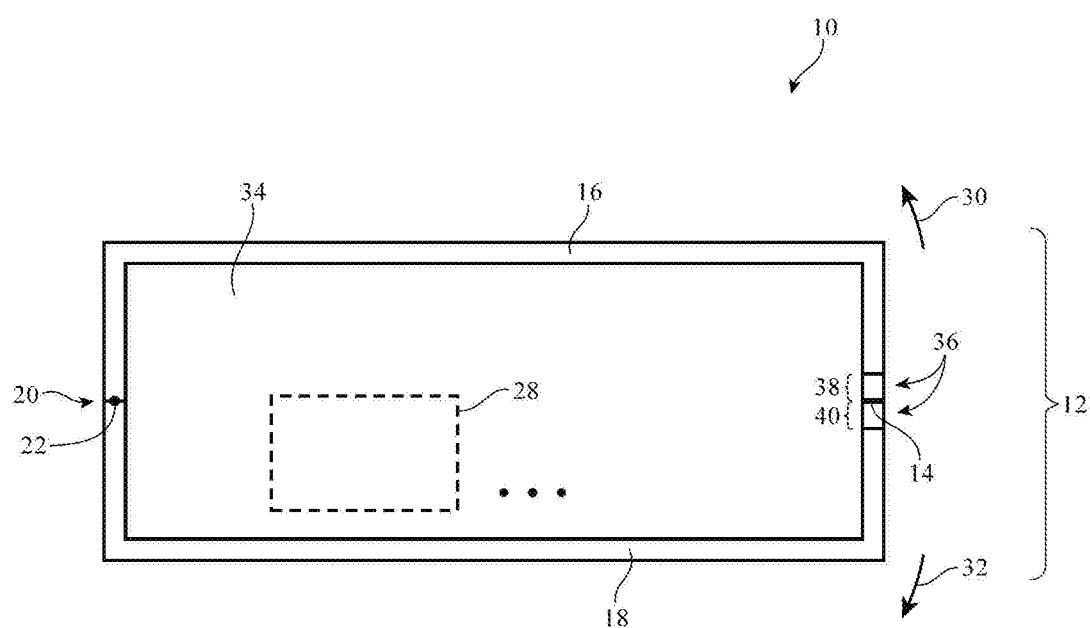
FIG. 2 is a cross-sectional side view of an illustrative item with an opening that may be secured using a magnetic fastener in accordance with an embodiment.

FIG. 2 is a cross-sectional side view of item 10 in a configuration in which item 10 is a bag, case, cover, or other item that is used as a container for articles such as article 28. Article 28 may be a personal item (e.g., keys, a wallet, glasses, etc.), an electronic device (e.g., a cellular telephone, tablet computer, etc.), or any other object. Portions 16 and 18 and other portions of body 12 may be characterized by a thickness (e.g., a wall thickness) and may be shaped to define an interior cavity for item 10 such as cavity 34. Articles 28 may be received within cavity 34.

In FIG. 2, item 10 is shown in a closed position in which portions 16 and 18 are joined along seam 14 using magnetic fastener 36. Magnetic fastener 36 may have a first portion such as portion 38 that is mounted to portion 16 of item 10 and may have a mating second portion such as portion 40 that is mounted to portion 18 of item 10. In the closed position of FIG. 2, portions 38 and 40 magnetically attract each other and therefore pull portions 16 and 18 together along the length of seam 14. This holds the opening in body 12 closed and ensures that articles 28 will not be inadvertently released from interior cavity 34 of item 10. When it is desired to create an opening in body 12 along seam 14, portions 38 and 40 can be reconfigured to magnetically repel each other, thereby moving portion 16 in direction 30 and/or moving portion 18 in direction 32. Magnetic fastener 36 can be placed in its attracting (closing) and repelling (opening) states using mechanical and/or electrically controlled mechanisms.

Figure 3:
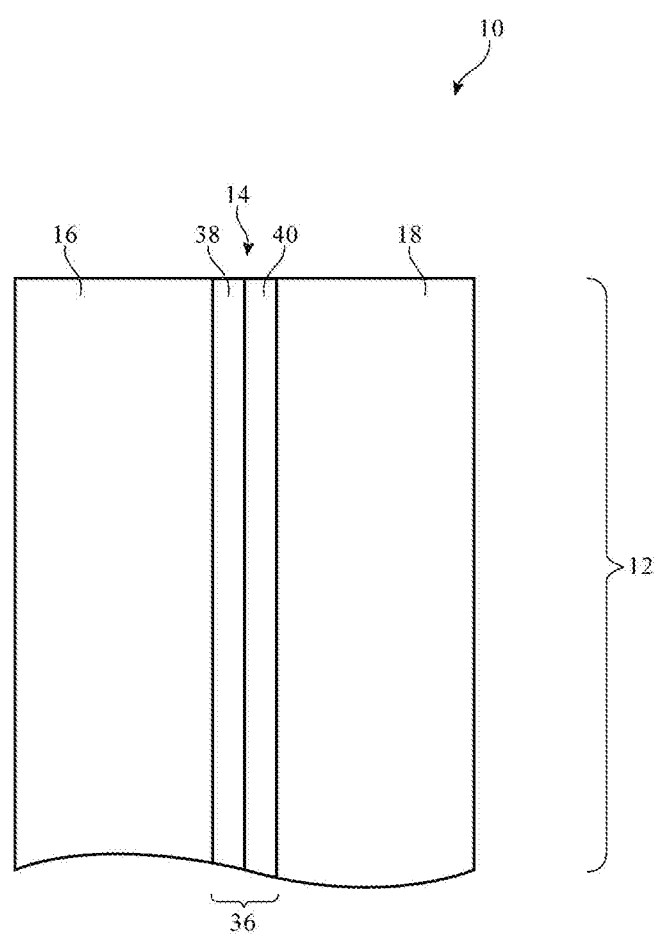
FIG. 3 is a diagram of an opening that has been sealed using a magnetic fastener in accordance with an embodiment.
Figure 4:
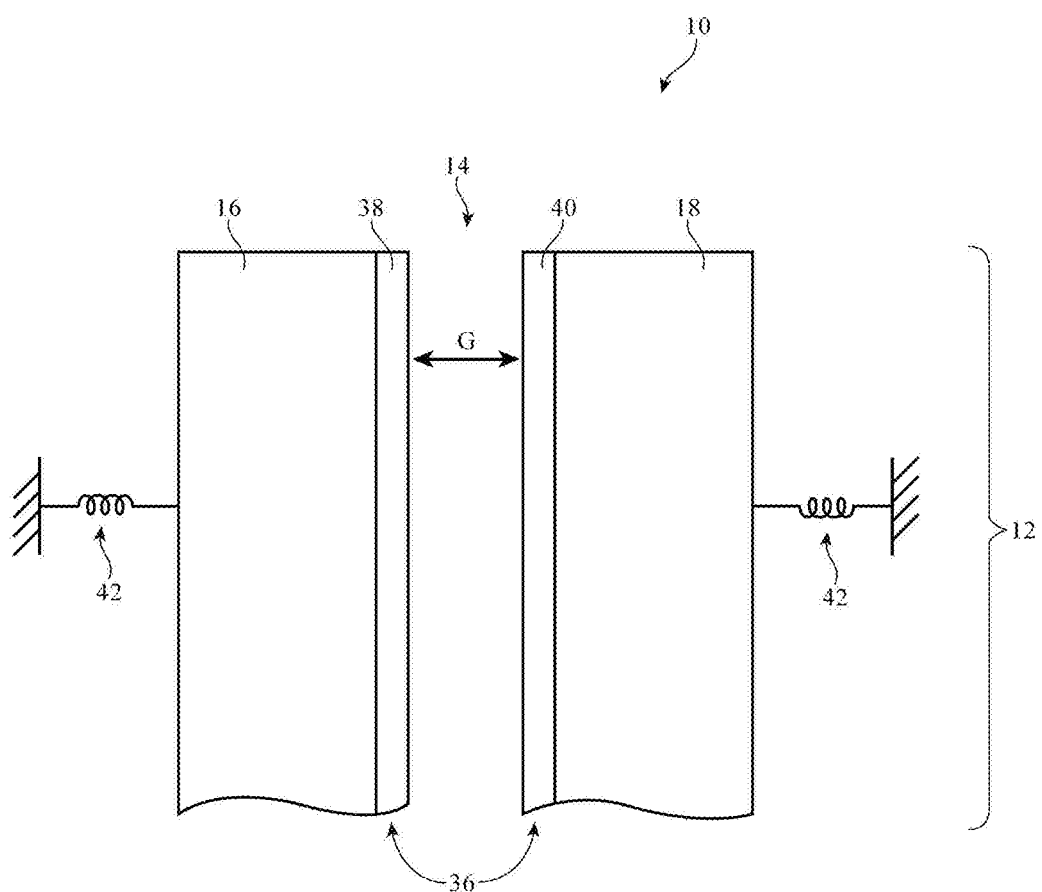
FIG. 4 is a diagram of the opening of FIG. 3 in which the magnetic fastener is in an open position in accordance with an embodiment.

Magnetic fastener 36 may have an elongated shape that extends along the length of seam 14. This helps ensure that the entire seam can be held closed without forming cracks. FIG. 3 is a side view of a portion of seam 14 that shows magnetic fastener 36 in a configuration in which portions 38 and 40 are magnetically attracting each other and have therefore closed the opening in item 10 along seam 14. FIG. 4 shows how magnetic fastener 36 may be configured so that portions 38 and 40 magnetically repel each other sufficiently to separate from each other and form a gap G between body portions 16 and 18. The size of the opening in body 12 that is formed by gap G may be sufficient for a user to insert a fingertip within gap G to help manually pull apart body portions 16 and 18 and thereby enlarge the opening in body 12. If desired, biasing structures 42 may be used to help enlarge the opening that is formed in body 12. Biasing structures 42 may be springs that are attached to portions 16 and/or 18, may be springs that form part of hinge 20, or may be other biasing mechanisms that help separate portions 16 and 18 from each other when seam 14 is released by fastener 36. When magnetic fastener 36 is in in its closed state, magnetic fastener structures 38 and 40 are preferably drawn toward each other with sufficient force to overcome the separating force imparted to structures 16 and 18 by biasing structures 42. If desired, biasing structures 42 may be omitted (e.g., in configurations in which a user of item 10 opens body 12 manually following release of magnetic fastener 36).

Magnetic fastener 36 may be formed from a pair of opposing strips of magnetic elements. The magnetic elements may include permanent magnets and/or ferromagnetic elements such as iron elements that are attracted to permanent magnets. The magnetic elements may be arranged to attract the opposing strips of fastener 36 together when closing the opening in body 12 and to repel the opposing strips of fastener 36 when forming the opening in body 12.

Figure 5:
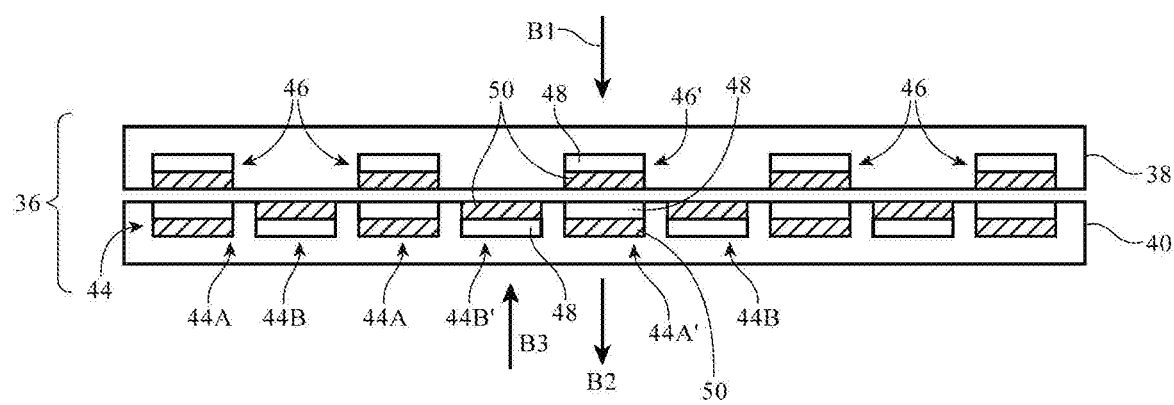
FIG. 5 is a cross-sectional side view of an illustrative magnetic fastener in a closed position in accordance with an embodiment.

An illustrative configuration for magnetic fastener 36 that is based on strips of magnetic elements is shown in FIG. 5. In the illustrative configuration of FIG. 5, strip 38 of fastener 36 has a row of magnets 46 and strip 40 of fastener 36 has a row of magnets 44. Magnets 44 include first and second sets of magnets 44A and 44B, respectively. First magnets 44A may alternate with second magnets 44B along the length of fastener 36 or magnets 44A and 44B may be organized in other patterns.

The poles of the magnets in fastener 36 may be oriented to produce both fastener closing and fastener opening states for fastener 36 depending on the relative linear position between strips 38 and 40. Magnets for fastener 36 may be permanent magnets such as rare earth magnets (e.g., neodymium magnets) or other magnetic elements.

Consider, as an example, magnet 46' of strip 38. Magnet 46' may have a first pole such as pole 48 and a second pole such as pole 50 that are oriented to produce magnetic field Bl. Magnet 46' may initially be aligned with opposing magnet 44A' in first magnet set 44A of strip 40. Magnet 44A' may have poles 48 and 50 that are arranged to produce magnetic field B2. Magnetic fields B1 and B2 may be oriented in the same direction, so that magnet 46' and magnet 44A' are attracted towards each other. Each of magnets 46 may likewise be aligned with a respective one of magnets 44A, so that magnets 46 and 44A are attracted together along the length of fastener 36. In this configuration (in which magnets 46 are aligned with attracting magnets 44A), strips 38 and 40 are pulled towards each other and close seam 14.

Magnets 44B have poles 48 and 50 that are reversed with respect to the poles of magnets 44A. Accordingly, magnets 44B produce magnetic fields that repel magnets 46. Consider, as an example, magnet 44B', which produces magnetic field B3. Magnetic field B3 is oriented to oppose magnetic field B1. Each of magnets 44B likewise has its poles oriented to produce a magnetic field that opposes the magnetic fields produced by magnets 46. Initially, when magnets 44A are in alignment with magnets 46 and magnets 44B are not in alignment with magnets 46, magnets 46 will be attracted towards magnets 44A. When it is desired to separate strips 38 and 40 in magnetic fastener 36, strips 38 and 40 may be shifted in position with respect to each other so that repelling magnets 44B are aligned with magnets 46 rather than attracting magnets 44A.

Figure 6:
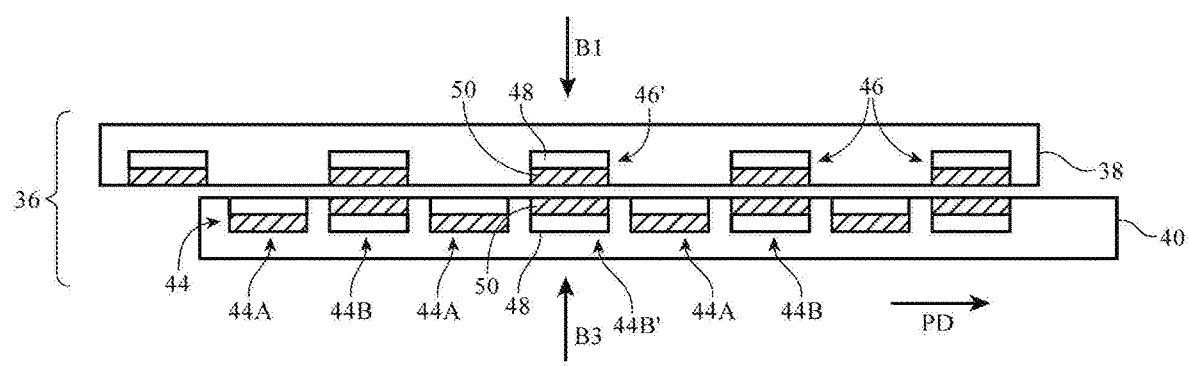
FIG. 6 is a cross-sectional side view of the illustrative magnetic fastener of FIG. 5 in a position for opening the fastener in accordance with an embodiment.

As shown in FIG. 6, for example, strip 40 may be shifted in direction PD when it is desired to separate strips 38 and 40 along seam 14. In particular, the position of strip 40 may be shifted with respect to strip 38 until repelling magnets 44B are aligned with magnets 46 rather than attracting magnets 44A. In this configuration, repelling magnetic fields such as field B3 from repelling magnet 44B' will oppose magnetic fields from magnets 46 such as field B1. This will cause each of repelling magnets 44B to repel its opposing magnet 46 along the length of strips 38 and 40. Strips 38 and 40 are therefore pushed away from each other along seam 14.

With this type of magnetic fastener arrangement, fastener 36 can be changed from its closing state to its opening state by moving the magnets in strip 40 relative to the magnets in strip 38. Relatively rapid small movements such as small shifting movements of strips 38 and 40 with respect to each other can be used to rapidly transition magnetic fastener 36 between attracting (closing) and repelling (opening) states.

Figure 7:
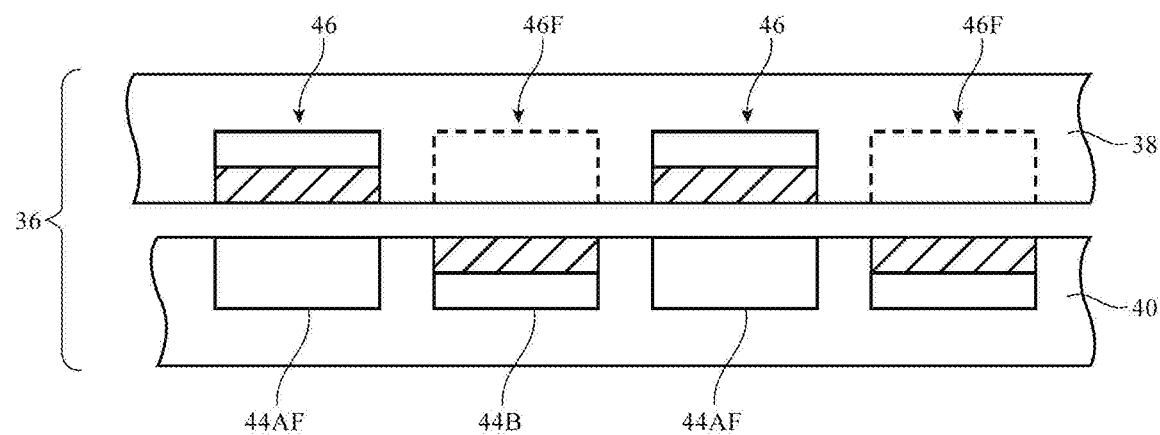
FIG. 7 is a cross-sectional side view of an illustrative magnetic fastener with ferromagnetic elements in accordance with an embodiment.

If desired, magnetic attraction can be achieved using ferromagnetic materials such as iron in place of attracting permanent magnets. As shown in FIG. 7, for example, elements 44AF in strip 40 may be ferromagnetic elements that are attracted to opposing permanent magnets 46. If desired, additional ferromagnetic elements may be used to help close fastener 36 (see, e.g., ferromagnetic elements 46F, which are attracted to magnets 44B). In the configuration of FIG. 7, fastener 36 is in its closed position. When it is desired to open fastener 36 of FIG. 7, strips 38 and 40 may be shifted in position relative to each other so that repelling magnets 44B are aligned with magnets 46 (i.e., so that magnets 44B and 46 produce opposing magnetic fields).

Figure 8:
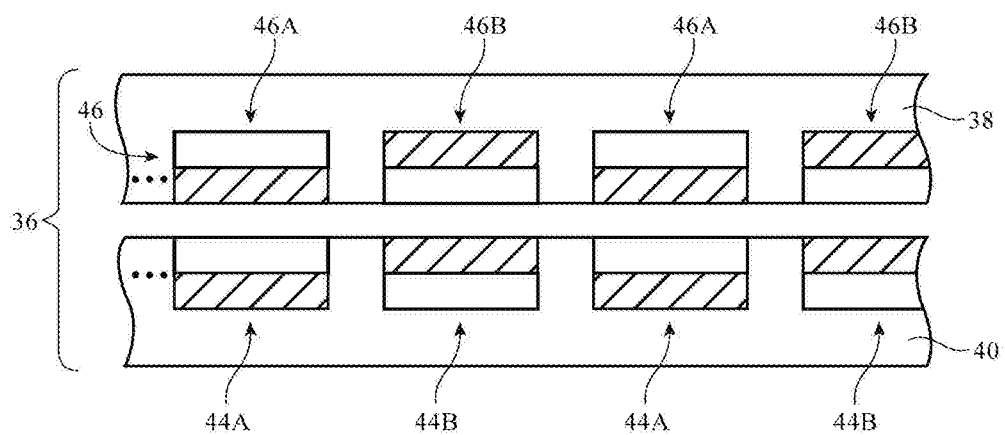
FIG. 8 is a cross-sectional side view of an illustrative magnetic fastener with rows of magnetic elements of alternating polarity in accordance with an embodiment.

Another illustrative configuration for magnetic fastener 36 is shown in FIG. 8. In the configuration of FIG. 8, magnets 46 include magnets 46A and 46B with alternating polarities. In the position of FIG. 8, magnets 46A attract magnets 44A and magnets 46B attract magnets 44B. When the position of strips 38 and 40 is shifted relative to each other, magnets 46A will repel magnets 44B and magnets 46B will repel magnets 44A. The use of additional magnets such as magnets 46B may help secure fastener 36 when fastener 36 is in its closed position.

The positions of strips 38 and 40 may be shifted relative to each other by moving strip 38, by moving strip 40, or by moving both of strips 38 and 40 in opposite directions. Manual strip moving schemes and/or electrically controlled strip moving schemes may be used for controlling the state of fastener 36.

Figure 9:
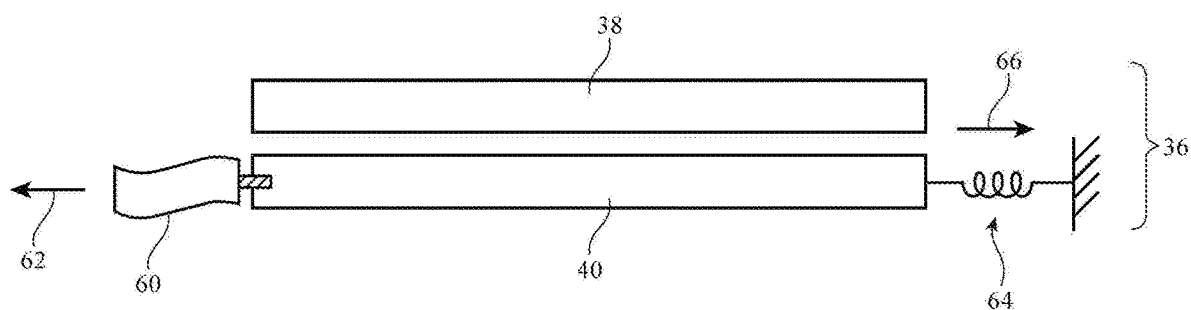
FIG. 9 is a diagram of an illustrative magnetic fastener with a pull tab in accordance with an embodiment.

An illustrative tab-based manual strip movement scheme is shown in FIG. 9. With the configuration of FIG. 9, tab 60 is attached to strip 40. When a user desires to change the state of fastener 36 by moving strip 40 relative to strip 38, the user may pull tab 60 in direction 62. This will shift strip 40 relative to strip 38 and will thereby change the alignment of the magnets in strips 38 and 40 so that fastener 36 transitions from a closed (magnets attracting) state to an open (magnets repelling) state. If desired, fastener 36 may include a biasing structure such as spring 64 to help restore strip 40 to its initial position after the user has finished pulling on tab 60. When spring 64 has been stretched by pulling on tab 60, spring 64 will exhibit a restoring force on strip 40 in direction 66. This restoring force will pull strip 40 into its original position after the user releases tab 60. Once strip 40 is in its original position, strips 38 and 40 will attract each other when the user closes the opening in body 14 by pushing strips 38 and 40 towards each other (e.g., when the user closes gap G of FIG. 4).

Figure 10:
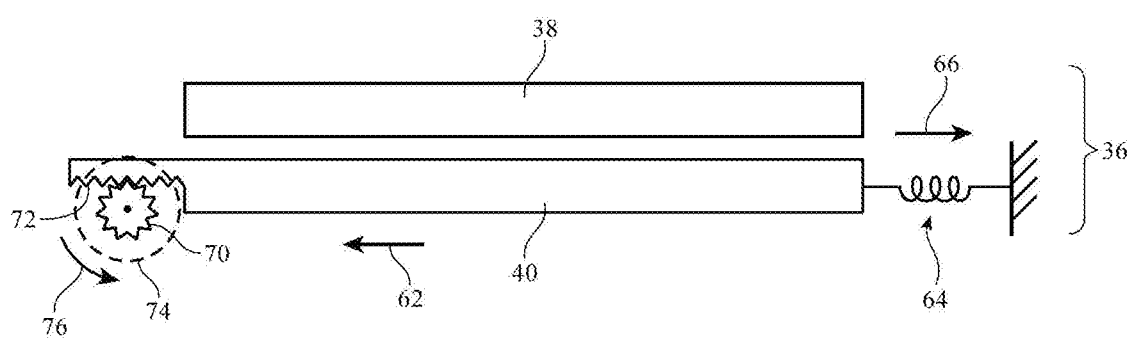
FIG. 10 is a diagram of an illustrative magnetic fastener with a rotating knob and a rack and pinion mechanism in accordance with an embodiment.

If desired, a rotary mechanism may be used to shift the position of strip 40 with respect to strip 38. This type of arrangement is shown in FIG. 10. A shown in FIG. 10, knob 74 may be coupled to pinion 70. Pinion 70 may have teeth that engage corresponding teeth on rack 72. Rack 72 may be coupled to strip 40 of fastener 36. Knob 74 may be rotated in direction 76 to move strip 40 in direction 62 relative to strip 38. A biasing structure such as spring 64 may impose a restoring force on strip 40 that moves strip 40 in direction 66 when the user releases knob 74.

Figure 11:
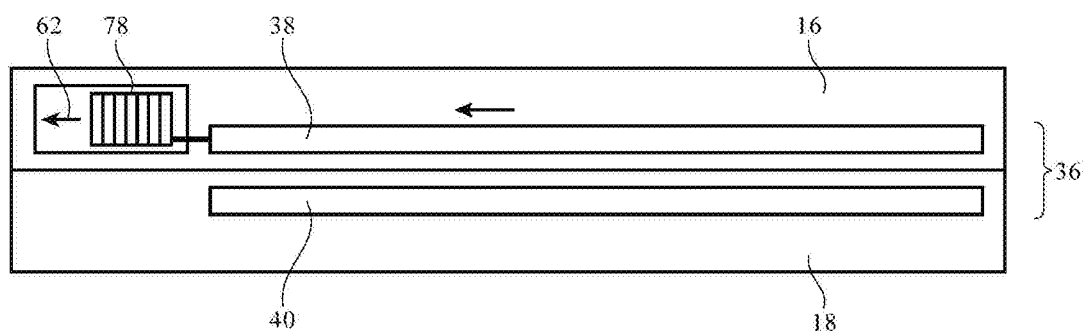
FIG. 11 is a diagram of an illustrative magnetic fastener with a sliding switch in accordance with an embodiment.

In the illustrative configuration of FIG. 11, strip 38 is coupled to sliding button 78. A user may slide button 78 and strip 38 in direction 62 when it is desired to open fastener 36. A spring or other biasing mechanism may be used to impose a restoring force on strip 38 so that strip 38 will be returned to its original position with respect to strip 40 when button 78 is released by the user.

Figure 12:
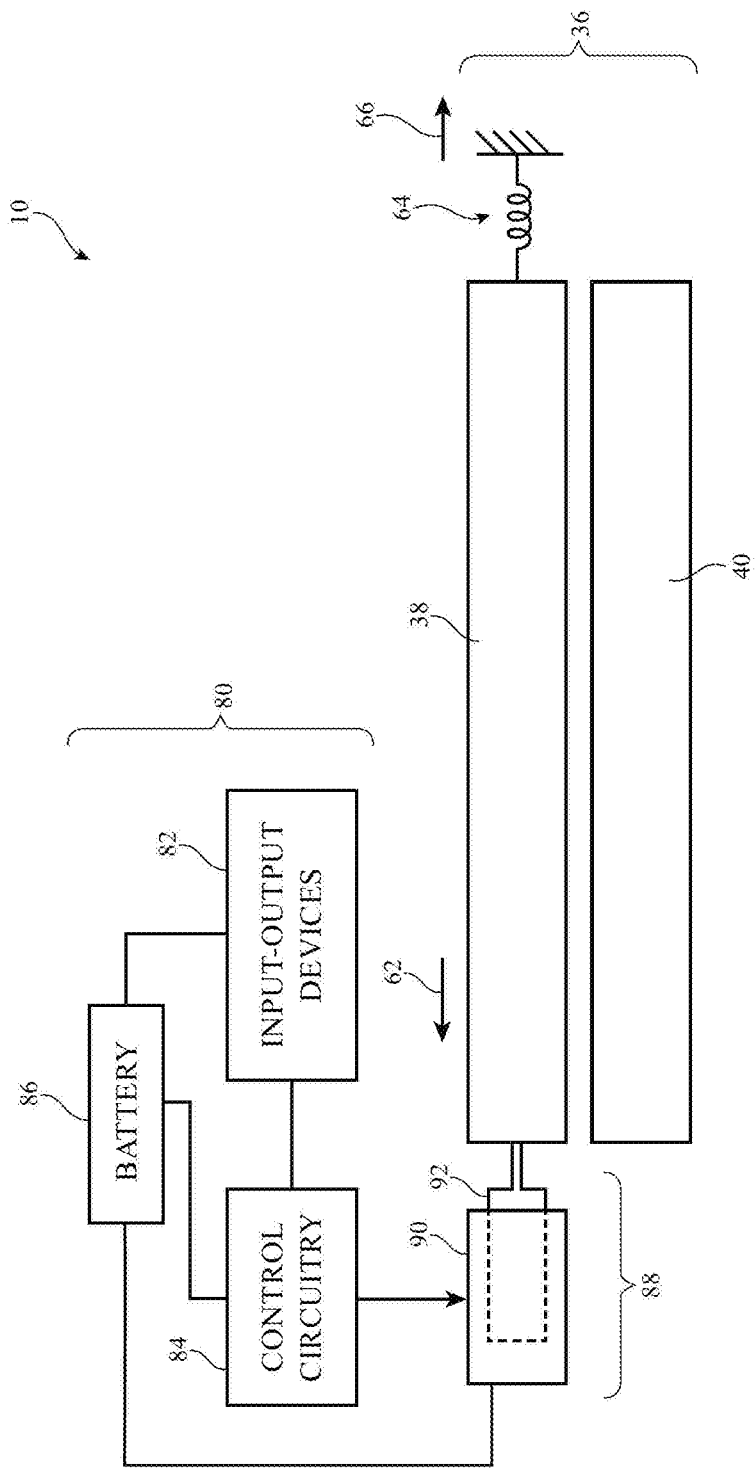
FIG. 12 is a diagram of an illustrative magnetic fastener with an electronically controlled opening and closing function in accordance with an embodiment.

FIG. 12 shows how circuitry 80 may be used in electronically opening and closing fastener 36. As shown in FIG. 12, circuitry 80 may include control circuitry 84 and input-output devices 82. Actuator 88 may be used to control the position of strip 38. Actuator 88 may be a solenoid, motor, or other electromechanical actuator. As shown in FIG. 12, actuator 88 may include a body such as body 90 that is fixed with respect to body 12 of item 10 and a sliding inner portion such as portion 92 that is coupled to strip 38. Battery 86 may supply power to control circuitry 84, input-output devices 82, and actuator 88.

Control circuitry 84 may include storage and processing circuitry. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 84 may be used to control the operation of actuator 88 and other resources in item 10. The processing circuitry may be based on one or more microprocessors, microcontrollers, digital signal processors, baseband processors, power management units, audio chips, application specific integrated circuits, etc.

Input-output circuitry in item 10 such as input-output devices 82 may be used to allow data to be supplied to item 10 and to allow data to be provided from item 10 to external devices. Input-output devices 82 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of item 10 by supplying commands through input-output devices 82 and may receive status information and other output from device 10 using the output resources of input-output devices 82. For example, a user who desires to open fastener 36 may supply an open command to control circuitry 84 using input-output devices 82. In response, control circuitry 84 may supply a command to actuator 88 that moves sliding member 92 and strip 38 in direction 62, thereby opening fastener 36. An optional biasing structure such as spring 64 may be used to help move strip 38 in direction 66 after the user has finished opening fastener 36.

Figure 13:
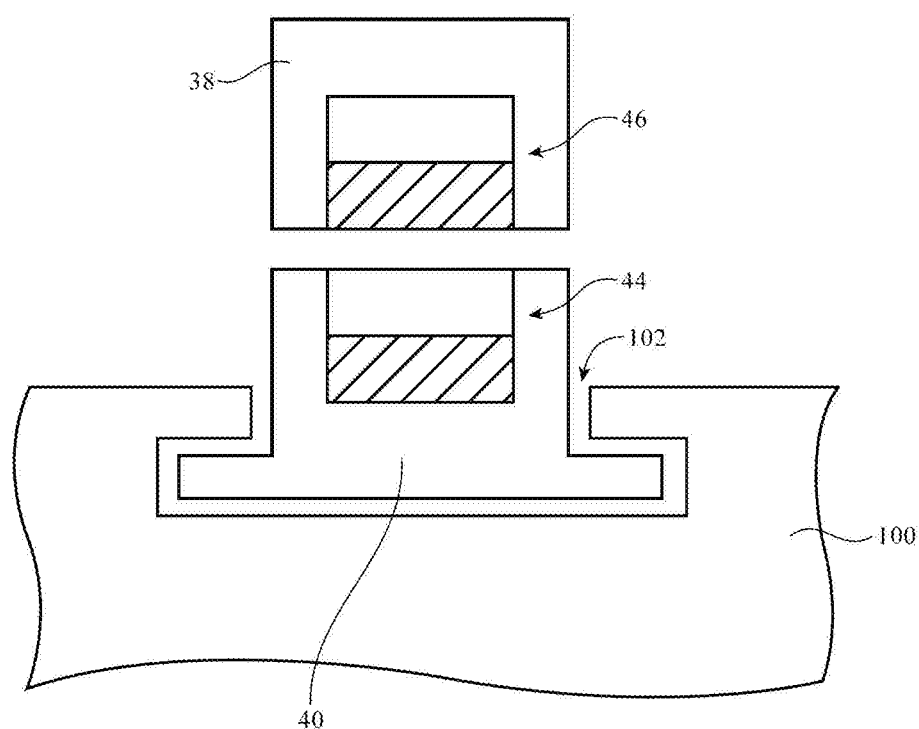
FIG. 13 is a cross-sectional end view of an illustrative magnetic fastener showing how the magnetic fastener may have a moving strip of magnets mounted in a track in accordance with an embodiment.

It may be desirable to guide strips such as strips 38 and 40 along curved paths and other paths in body 12. FIG. 13 is a cross-sectional side view of fastener 36 showing how strips such a strip 40 may be guided within opening 102 in a track structure such as track 100. Track 100 may be formed as an integral part of body 12 or may be attached to body 12. For example, track 100 may form part of portion 18. In the example of FIG. 13, strip 40 is captured within track 100 and can slide in and out of the page of FIG. 13 while remaining within track 100.

Figure 14:
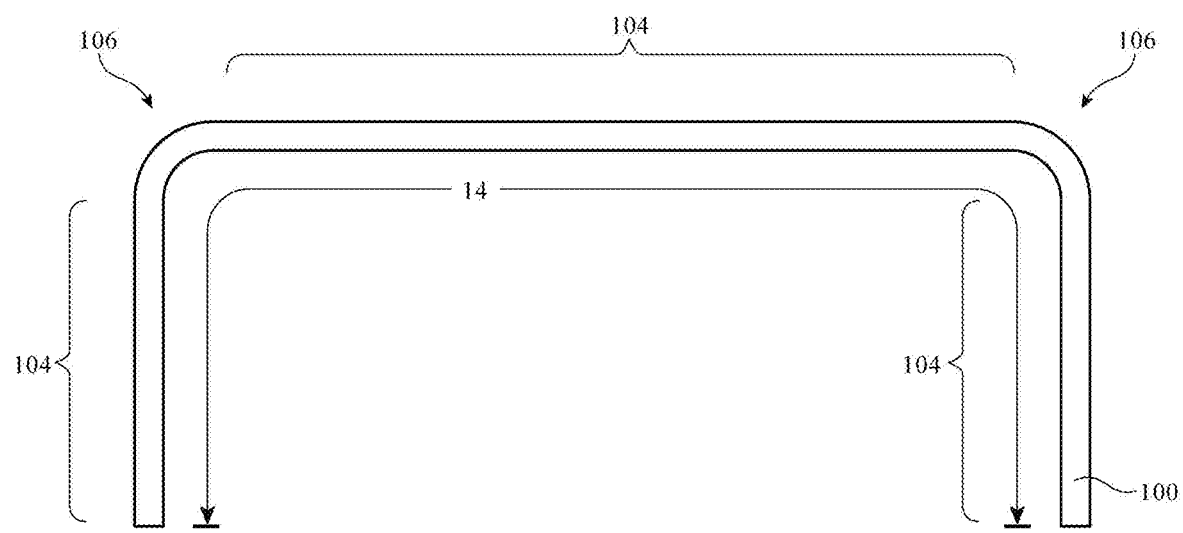
FIG. 14 is a top view of an illustrative magnetic fastener that follows a path established by a track with straight and curved portions in accordance with an embodiment.
Figure 15:
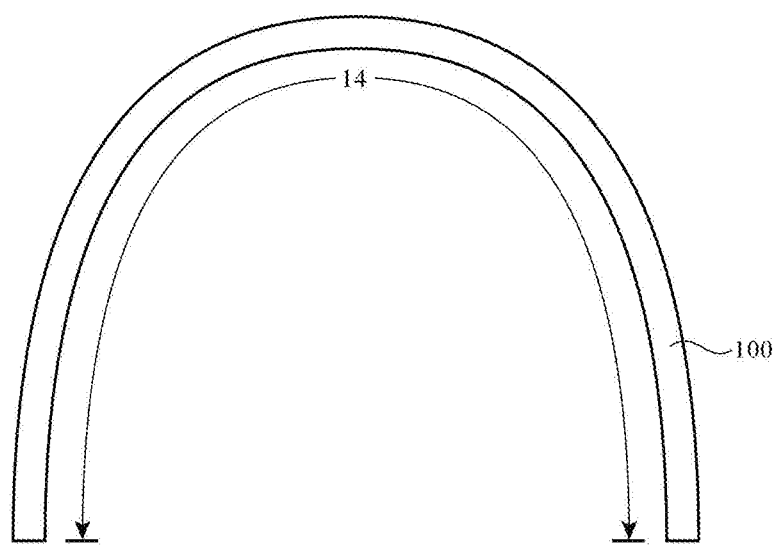
FIG. 15 is a top view of an illustrative magnetic fastener that follows a curved path in accordance with an embodiment.
Figure 16:
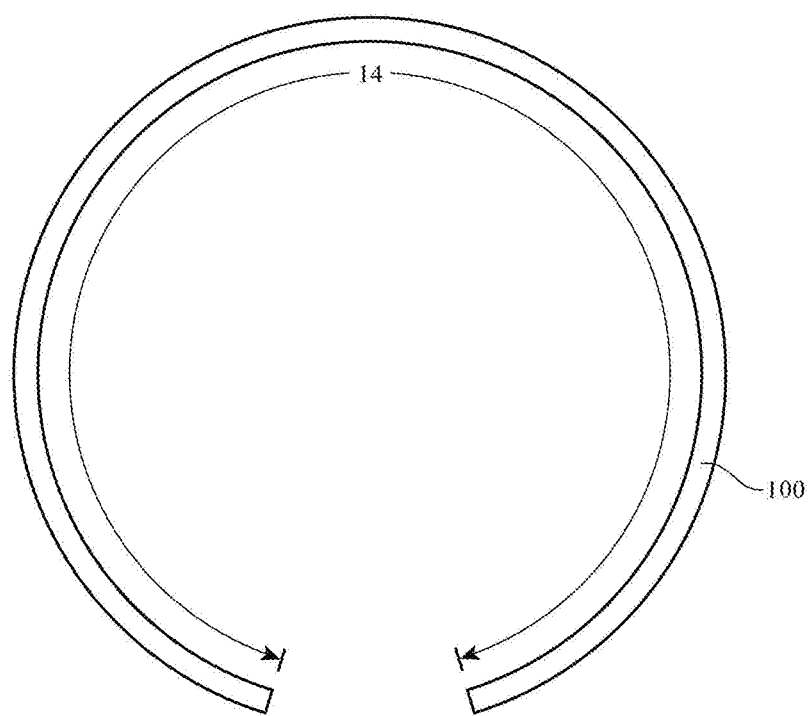
FIG. 16 is a top view of an illustrative magnetic fastener that follows a circular path in accordance with an embodiment.

As shown in FIG. 14, track 100 may have straight portions 104 and curved corners 106. The example of FIG. 15 shows how track 100 may have a curved shape. In the illustrative configuration FIG. 16, track 100 has been curved to form a circular shape. These configurations are merely illustrative. If desired, track 100 may have other shapes (e.g., curved path shapes, path shapes with combinations of curved and straight portions, path shapes with non-parallel straight segments, etc.).

Figure 18:
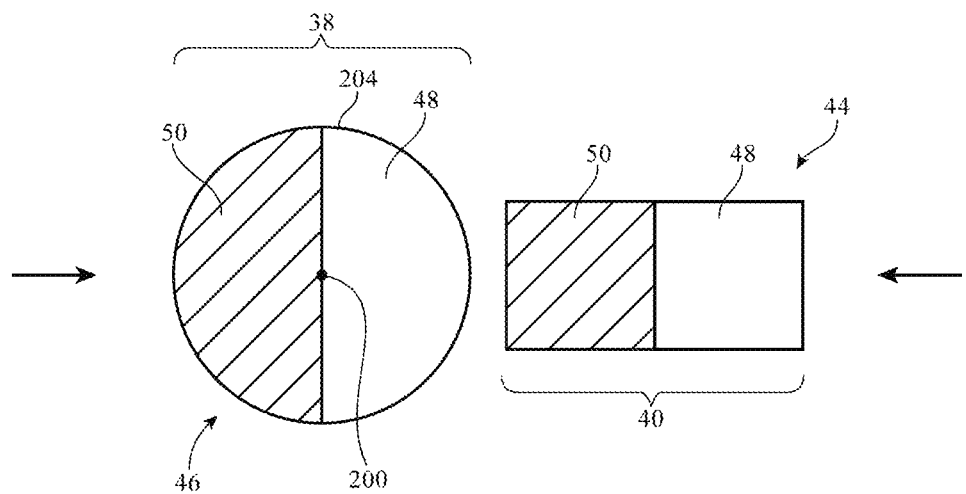
FIG. 18 is a cross-sectional end view of a rotary magnetic fastener in a closed position in accordance with an embodiment.
Figure 19:
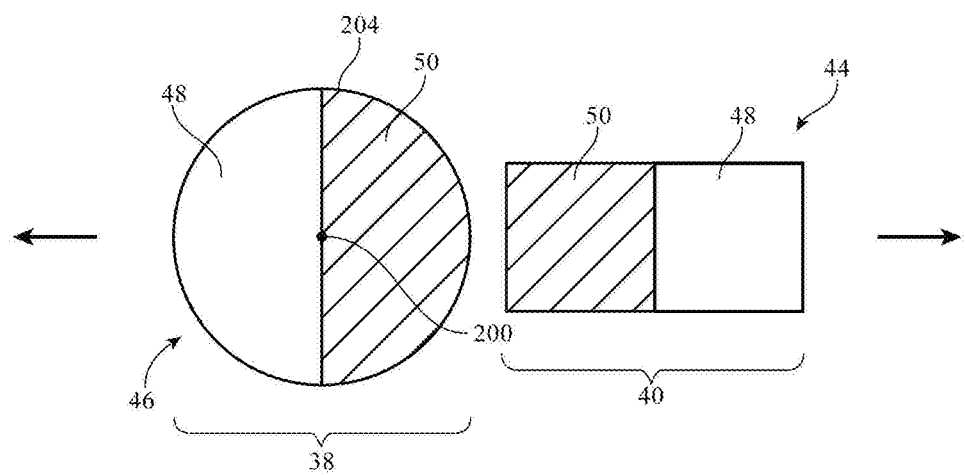
FIG. 19 is a cross-sectional end view of the rotary magnetic fastener of FIG. 18 in which magnetic elements have been rotated to open the fastener in accordance with an embodiment.

If desired, elongated magnetic fastener 36 may be implemented using a mechanism that rotates a strip of magnetic elements. This type of configuration is shown in the perspective view of FIG. 17. FIGS. 18 and 19 are cross-sectional side views of fastener 36 of FIG. 17 taken along line 206 and viewed in direction 208.

Figure 17:
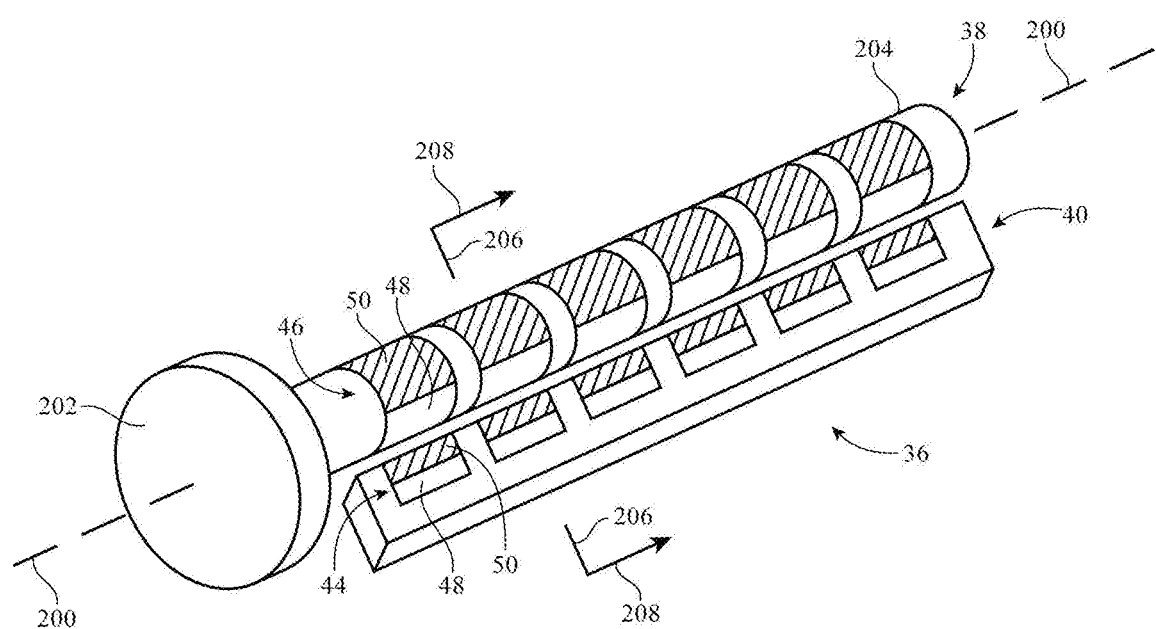
FIG. 17 is a perspective view of an illustrative magnetic fastener with a rotary action in accordance with an embodiment.

As shown in FIG. 17, magnetic fastener 36 may have a strip of magnets 44 such as strip 40. Magnetic fastener 36 may also have a strip of magnets 46 such as strip 38. Strip 38 may have a rotating shaft such as shaft 204 that contains a row of magnets 46. Shaft 204 may have a knob such as knob 202. A user may rotate knob 202 to rotate shaft 204 and magnets 46 about rotational axis 200. When poles 48 of magnets 46 on shaft 204 are rotated into opposition with opposing poles 50 of corresponding magnets 44 on strip 40 as shown in FIG. 18, strip 40 and shaft 204 will be attracted towards each other and fastener 36 will be closed. When poles 50 of magnets 46 on shaft 204 are rotated into opposition with poles 50 of magnets 44 as shown in FIG. 19, shaft 204 and strip 40 will be repelled from each other and fastener 36 will be opened.

If desired, shaft 204 may be electrically controlled. For example, shaft 204 may be rotated using an actuator such as electrically controlled actuator 88 of FIG. 12 in response to user commands supplied through input-output devices 82.

Shaft 204 may be formed from a rigid material and may have a straight shape or shaft 204 may be formed from a flexible material. When shaft 204 is formed from a flexible material, shaft 204 may follow a curved path of the type show by curved tracks 100 of FIGS. 14, 15, and 16. Shaft 204 may, if desired, be mounted within hollow piping or other trim feature in body 12 that extends along the length of seam 14.

In accordance with an embodiment, apparatus is provided that includes a body having an interior and having body portions that open and close along a seam to provide access to the interior from outside the body through an opening in the body, and an elongated magnetic fastener that extends along the seam, the elongated magnetic fastener is operable in a closed state to hold the body portions together to close the opening and an open state to separate the body portions from each other to open the opening.

In accordance with another embodiment, the elongated magnetic fastener has first and second portions that are magnetically attracted to each other in the closed state and that are magnetically repelled from each other in the open state.

In accordance with another embodiment, the first and second portions include respective first and second strips of magnets that are shifted with respect to each other to transition the magnetic fastener between the closed state and the open state.

In accordance with another embodiment, the elongated magnetic fastener has first and second portions that are magnetically attracted to each other in the closed state.

In accordance with another embodiment, the first portion includes a strip of magnets and the first and second portions are shifted with respect to each other to transition the magnetic fastener between the closed state and the open state.

In accordance with another embodiment, the first portion includes magnets and the first and second portions are shifted with respect to each other to transition the magnetic fastener between the closed state and the open state.

In accordance with another embodiment, the elongated magnetic fastener has first and second strips of magnets.

In accordance with another embodiment, the first and second strips of magnets are shifted with respect to each other to transition the magnetic fastener between the closed state and the open state.

In accordance with another embodiment, the second strip of magnets includes a first set of magnets that is attracted to the first strip of magnets when the magnetic fastener is in the closed state.

In accordance with another embodiment, the second strip of magnets includes a second set of magnets that is repelled from the first strip of magnets when the magnetic fastener is in the open state.

In accordance with another embodiment, the elongated magnetic fastener includes at least one strip of magnets.

In accordance with another embodiment, the elongated magnetic fastener has first and second strips of magnets, the apparatus includes a tab that is pulled to shift the first and second strips of magnets with respect to each other.

In accordance with another embodiment, the elongated magnetic fastener has first and second strips of magnets, the apparatus includes a knob that is rotated to shift the first and second strips of magnets with respect to each other.

In accordance with another embodiment, the elongated magnetic fastener has first and second strips of magnets, the apparatus includes an electrically controlled actuator that shifts the first and second strips of magnets with respect to each other.

In accordance with another embodiment, the apparatus includes an input-output device that receives an input from a user, and control circuitry that controls the electrically controlled actuator in response to receiving the input from the user.

In accordance with another embodiment, the first and second portions each have a plurality of magnets.

In accordance with another embodiment, the first portion has a rotating shaft that supports the plurality of magnets in the first portion.

In accordance with another embodiment, the body is shaped to form an item selected from the group consisting of a bag, a case, and a cover.

In accordance with another embodiment, the seam follows a curved path and the elongated magnetic fastener follows the curved path.

In accordance with another embodiment, the apparatus includes a hinge that supports the body portions as the body portions open and close along the seam.

In accordance with another embodiment, the elongated magnetic fastener has first and second portions that are magnetically attracted to each other in the closed state and that are not magnetically attracted to each other in the open state.

In accordance with an embodiment, an elongated magnetic fastener for securing an opening in a body of an item, the elongated magnetic fastener is operable in an closed state that holds portions of the body together to close the opening along a seam in the body and is operable in an open state in which the portions of the body are not held together along the seam, including a first strip of magnets that runs along the seam, and a second strip of magnets that runs along the seam parallel to the first strip of magnets, the second strip of magnets includes a first set of magnets that attracts the first strip of magnets when the magnetic fastener is in the closed state and includes a second set of magnets that repels the first strip of magnets when the magnetic fastener is in the open state.

In accordance with another embodiment, the magnetic fastener includes a track that captures the second strip of magnets, the track runs along the seam and the second strip of magnets is guided along the track while the second strip of magnets shifts position with respect to the first strip of magnets.

In accordance with another embodiment, at least part of the track is curved.

In accordance with another embodiment, the body forms an enclosure that is part of an item selected from the group consisting of a bag, a case, and a cover.

In accordance with an embodiment, an enclosure is provided that includes a hinge, a body that has first and second portions coupled to the hinge, the first and second portions open and close along a seam in the body, and an elongated magnetic fastener that runs along the seam, the elongated magnetic fastener has a first strip of magnets and a second strip of magnets and the first and second strips of magnets shift with respect to each other to place the elongated magnetic fastener in an open state in which the second strip of magnets repels the first strip of magnets to open the magnetic fastener.

In accordance with another embodiment, the elongated magnetic fastener has a first strip of magnets and a second strip of magnets and the first and second strips of magnets shift with respect to each other to place the elongated magnetic fastener in a closed state in which the second strip of magnets attracts the first strip of magnets to close the magnetic fastener.

In accordance with another embodiment, the second strip of magnets includes a first set of magnets with magnetic poles oriented to produce magnetic fields in a first direction and includes a second set of magnets with magnetic poles oriented to produce magnetic fields in a second direction opposite the first direction.

The foregoing is merely illustrative and various modifications can be made by those skilled in the art without departing from the scope and spirit of the described embodiments. The foregoing embodiments may be implemented individually or in any combination.

What is claimed is:

1. Apparatus, comprising:
    a fabric body having an interior and having body portions that open and close along a seam to provide access to the interior from outside the fabric body through an opening in the fabric body; and
    an elongated magnetic fastener having a curved track that extends along a curved portion of the seam of the fabric body, wherein the elongated magnetic fastener is operable in a closed state to hold the body portions together to close the opening and an open state to separate the body portions from each other to open the opening, and wherein the elongated magnetic fastener includes magnets that move within the curved track when the elongated magnetic fastener switches between the closed state and the open state.

2. The apparatus defined in claim 1 wherein the elongated magnetic fastener has first and second portions that are magnetically attracted to each other in the closed state and that are magnetically repelled from each other in the open state.

3. The apparatus defined in claim 2 wherein the magnets comprise respective first and second strips of magnets in the first and second portions that are shifted with respect to each other to transition the magnetic fastener between the closed state and the open state.

4. The apparatus defined in claim 1 wherein the elongated magnetic fastener has first and second portions that are magnetically attracted to each other in the closed state.

5. The apparatus defined in claim 4 wherein the magnets include a strip of magnets in the first portion and wherein the first and second portions are shifted with respect to each other to transition the magnetic fastener between the closed state and the open state.

6. The apparatus defined in claim 4 wherein the first portion includes the magnets and wherein the first and second portions are shifted with respect to each other to transition the magnetic fastener between the closed state and the open state.

7. The apparatus defined in claim 1 wherein the magnets comprise first and second strips of magnets.

8. The apparatus defined in claim 7 wherein the first and second strips of magnets are shifted with respect to each other to transition the magnetic fastener between the closed state and the open state.

9. The apparatus defined in claim 8 wherein the second strip of magnets includes a first set of the magnets that is attracted to the first strip of magnets when the magnetic fastener is in the closed state.

10. The apparatus defined in claim 9 wherein the second strip of magnets includes a second set of the magnets that is repelled from the first strip of magnets when the magnetic fastener is in the open state.

11. The apparatus defined in claim 1 wherein the magnets include at least one strip of magnets.

12. The apparatus defined in claim 1 wherein the magnets include first and second strips of magnets, the apparatus further comprising:
    a tab that is pulled to shift the first and second strips of magnets with respect to each other.

13. The apparatus defined in claim 1 wherein the magnets include first and second strips of magnets, the apparatus further comprising:
    a knob that is rotated to shift the first and second strips of magnets with respect to each other.

14. The apparatus defined in claim 1 wherein the magnets include first and second strips of magnets, the apparatus further comprising:
an electrically controlled actuator that shifts the first and second strips of magnets with respect to each other.

15. The apparatus defined in claim 14 further comprising:
an input-output device that receives an input from a user; and
control circuitry that controls the electrically controlled actuator in response to receiving the input from the user.

16. The apparatus defined in claim 1 wherein the elongated magnetic fastener has first and second portions and wherein the magnets include a plurality of magnets in the first portion.

17. The apparatus defined in claim 16 wherein the first portion has a rotating shaft that supports the plurality of magnets in the first portion.

18. The apparatus defined in claim 1 wherein the fabric body is shaped to form an item selected from the group consisting of: a bag, a case, and a cover.

19. The apparatus defined in claim 1 further comprising a hinge that supports the body portions as the body portions open and close along the seam.

20. The apparatus defined in claim 1 wherein the elongated magnetic fastener has first and second portions that are magnetically attracted to each other in the closed state and that are not magnetically attracted to each other in the open state.

21. An item, comprising:
a fabric body; and
an elongated magnetic fastener for securing an opening in the fabric body, wherein the elongated magnetic fastener is operable in a closed state that holds portions of the fabric body together to close the opening along a seam in the fabric body and is operable in an open state in which the portions of the fabric body are not held together along the seam, comprising:
a first strip of magnets that runs along the seam of the fabric body;
a second strip of magnets that runs along the seam of the fabric body parallel to the first strip of magnets, wherein the second strip of magnets includes a first set of magnets that attracts the first strip of magnets when the magnetic fastener is in the closed state and includes a second set of magnets that repels the first strip of magnets when the magnetic fastener is in the open state; and
an electromechanical actuator that slides the second strip of magnets to switch the elongated magnetic fastener between the open state and the closed state.

22. The item defined in claim 21 further comprising a track that captures the second strip of magnets, wherein the track runs along the seam and wherein the second strip of magnets is guided along the track while the second strip of magnets shifts position with respect to the first strip of magnets.

23. The item defined in claim 22 wherein at least part of the track is curved.

24. The item defined in claim 23 wherein the fabric body forms an enclosure that is part of an item selected from the group consisting of: a bag, a case, and a cover.

25. An enclosure, comprising:
a hinge;
a fabric body that has first and second portions coupled to the hinge, wherein the first and second portions open and close along a seam in the fabric body; and
an elongated magnetic fastener that runs along the seam of the fabric body, wherein the elongated magnetic fastener has a first strip of magnets and a second strip of magnets and wherein the first strip of magnets rotates with respect to the second strip of magnets about a rotation axis that is parallel to at least part of the seam to place the elongated magnetic fastener in an open state in which the second strip of magnets repels the first strip of magnets to open the magnetic fastener.

26. The enclosure defined in claim 25, wherein the first and second strips of magnets shift with respect to each other to place the elongated magnetic fastener in a closed state in which the second strip of magnets attracts the first strip of magnets to close the magnetic fastener.

27. The enclosure defined in claim 26 wherein the second strip of magnets includes a first set of magnets with magnetic poles oriented to produce magnetic fields in a first direction and includes a second set of magnets with magnetic poles oriented to produce magnetic fields in a second direction opposite the first direction.

* * * * *